United States Patent [19]
Werner et al.

[11] Patent Number: 5,407,238
[45] Date of Patent: Apr. 18, 1995

[54] CLIP FOR PIPES

[75] Inventors: Wolfgang Werner, Reutlingen; Ernst-Ludwig Hahn, Rabenau, both of Germany

[73] Assignee: Emhart Inc., Newark, Del.

[21] Appl. No.: 147,242

[22] Filed: Nov. 3, 1993

[30] Foreign Application Priority Data

Nov. 11, 1992 [DE] Germany .................. 42 38 098.7

[51] Int. Cl.$^6$ ................................. F16L 3/00
[52] U.S. Cl. ..................... 285/61; 285/175; 285/382; 285/423; 285/921; 285/369
[58] Field of Search ............... 285/176, 175, 369, 61, 285/94, 373, 62, 417, 63, 419, 64, 382, 423; 248/74.3

[56] References Cited
U.S. PATENT DOCUMENTS

| | | |
|---|---|---|
| 320,645 | 6/1885 | Fischer ................ 285/176 X |
| 3,637,177 | 1/1972 | Santucci . |
| 3,937,499 | 2/1976 | Courtot ................ 285/61 X |
| 4,779,828 | 10/1988 | Munch ................ 248/74.3 |

FOREIGN PATENT DOCUMENTS

| | | |
|---|---|---|
| 0257367 | 3/1988 | European Pat. Off. . |
| 3344111 | 6/1985 | Germany . |
| 1578522 | 11/1980 | United Kingdom . |

*Primary Examiner*—Dave W. Arola
*Attorney, Agent, or Firm*—Edward D. Murphy

[57] ABSTRACT

A clip for providing end to end connection between a rigid and a flexible hydraulic pipe comprises a base by which it may be attached to a workpiece, a frame portion extending upwardly from the base having a circular bore, which can receive a rigid pipe as a force fit, and a hexagonal bore which may receive a flexible pipe and hold it against twisting and clamp means on the base to embrace the flexible pipe and hold it in position.

4 Claims, 2 Drawing Sheets

CLIP FOR PIPES

BACKGROUND TO THE INVENTION

This invention is concerned with clips for pipes.

There are many circumstances, for example in the manufacture of automobiles, when it is desired to make a connection between a rigid hydraulic pipe and a flexible hydraulic pipe in a hydraulic circuit. It is at the same time desirable to ensure that such connection is secure and cannot work loose inadvertently and to be able, if required, each to separate the flexible and rigid pipes.

It is an object of the present invention to provide a convenient clip for providing an end to end connection between a rigid hydraulic pipe and a flexible hydraulic pipe.

The present invention provides a clip for a rigid hydraulic pipe and a flexible hydraulic pipe in end-to-end communication comprising:

a base, a frame portion extending upwardly from the base and comprising a circular bore adapted to receive an end portion of a rigid pipe as a force fit and a coaxial polygonal bore adapted to receive an end portion of a flexible pipe and hold it against twisting and clamp means extending upwardly from the base and comprising two generally circularly extending arms having interengageable catches, which arms can be interengaged to embrace a flexible pipe whose end portion is in the polygonal bore and hold the pipe against axial movement.

DETAILED DESCRIPTION OF THE INVENTION

A preferred embodiment of the invention will now be described with reference to the accompanying drawings.

Figure 1:
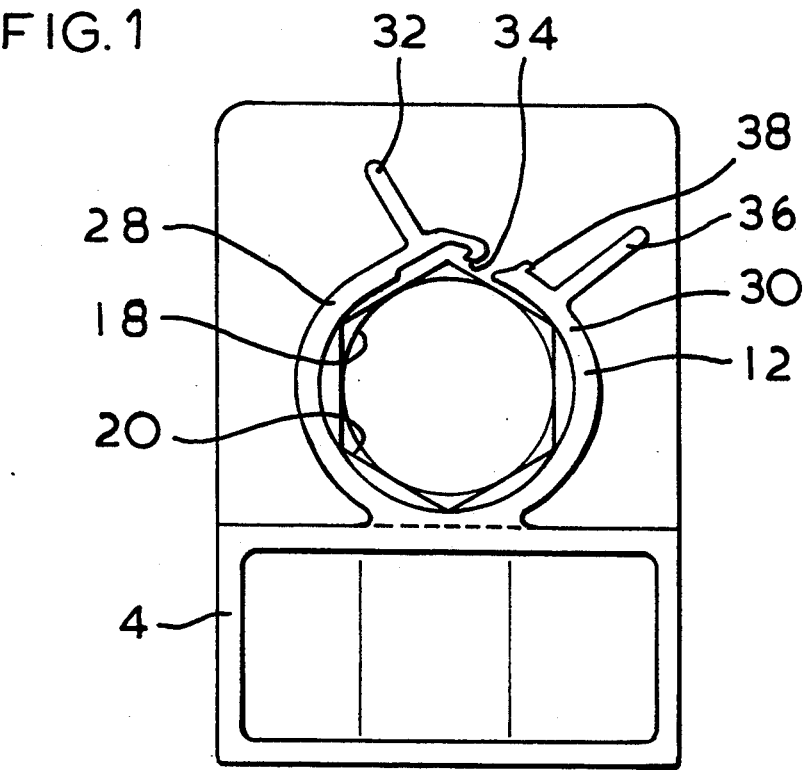
FIG. 1 shows a front end view of a clip embodying the invention.
Figure 2:
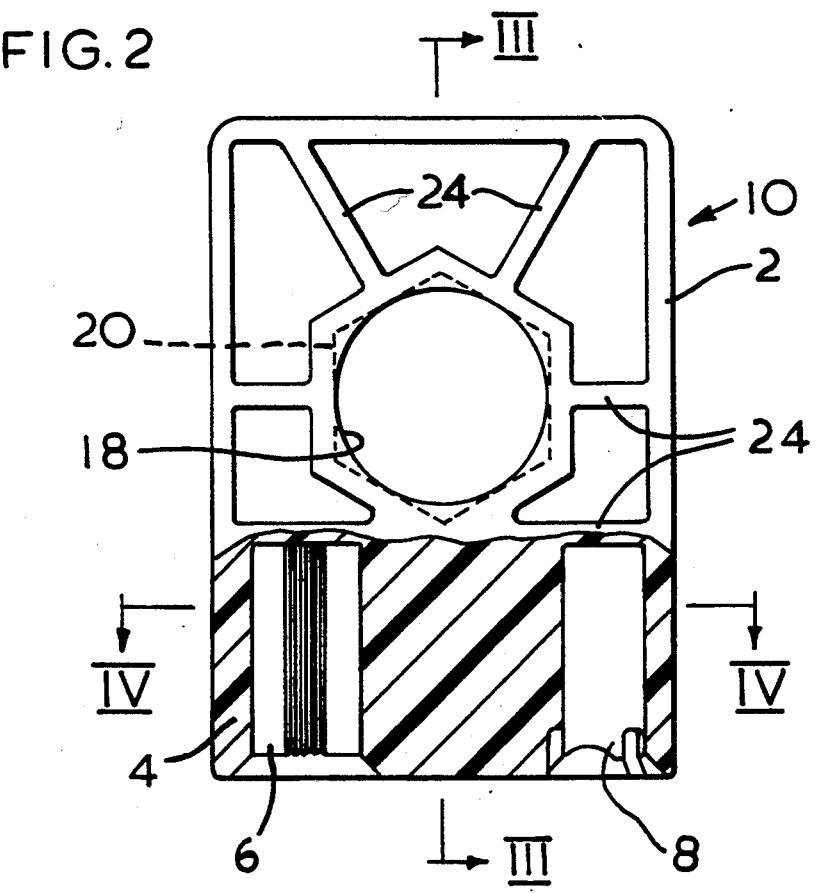
FIG. 2 shows a rear end view of the clip, partly broken away.

The clip shown in the drawings is adapted for use in providing an end-to-end connection between a rigid hydraulic pipe and a flexible hydraulic pipe.

The clip (2) comprises a base (4) which is provided with two socket members (6,8) by which it can conveniently be secured to a workpiece bearing two conventional upstanding studs of ribbed cross section.

Figure 3:
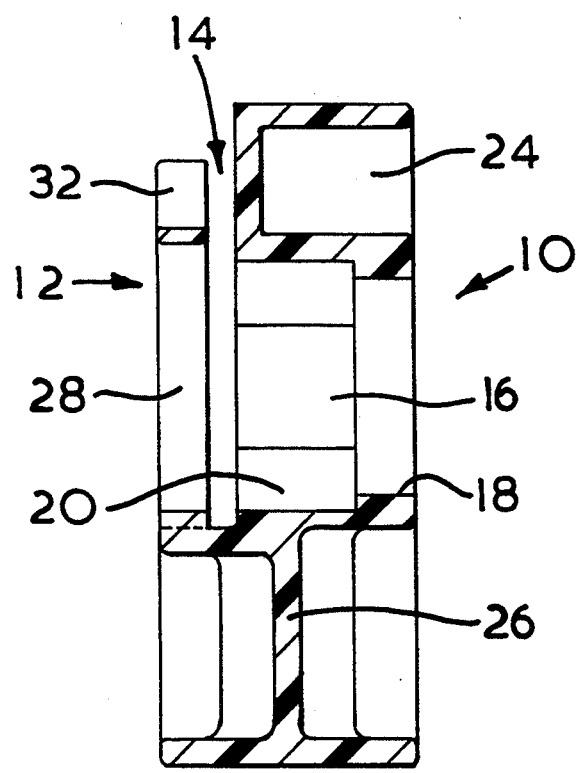
FIG. 3 shows a section of the line III—III of FIG. 2.
Figure 4:
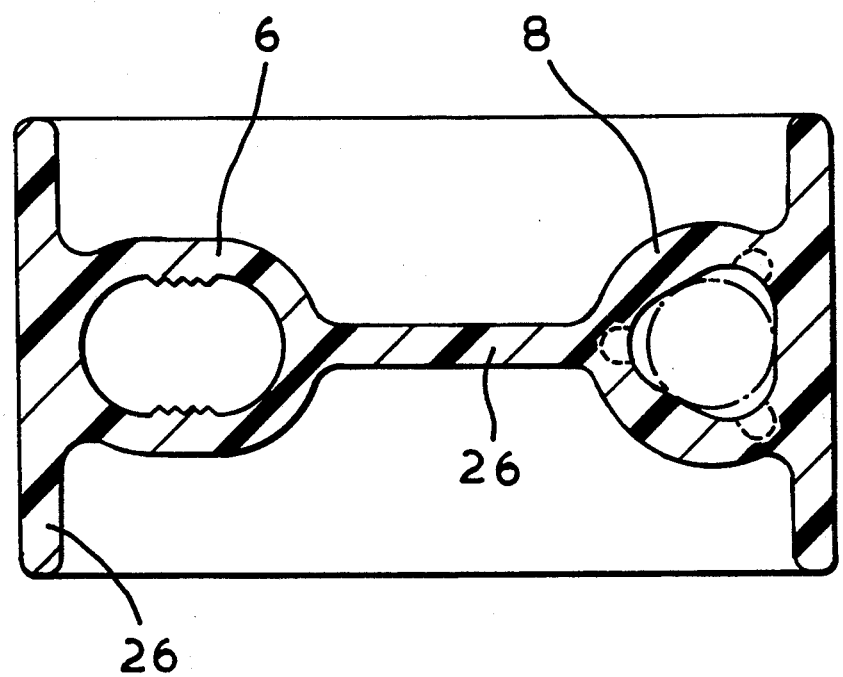
FIG. 4 shows a section of the line IV—IV of FIG. 2.

Upstanding from the base (4) is a frame portion (10) and a clamp portion (12), which are separated by a gap (14) (FIG. 3). The frame portion (10) comprises a through bore (16), which is made up of a circular portion (18), arranged to be of the correct diameter for a rigid hydraulic pipe to be force fitted into it, and a polygonal, specifically hexagonal, portion (20), whose smallest diameter corresponds to the diameter of the portion (18), while its largest diameter is somewhat larger.

As can be seen from the drawings, the frame portion (10) is provided with recesses bounded by ribs (24) which are arranged so that the portion (10) is rigid while light in weight. Similarly the base (4) comprises recesses bounded by ribs (26) and the socket members (6,8), again giving rigidity combined with lightness.

The clamp portion (12) comprises two locking members (28,30) extending in a generally circular manner from the base (4), and generally concentric with the bore (16). A first locking member (28) comprises an outwardly extending finger piece or lever (32) and an inwardly facing catch (34), the second locking member (30) comprising an outwardly extending finger piece or lever (36) and an outwardly facing catch (38).

When the clip is in use, one end portion of a rigid hydraulic pipe is forced into the circular portion (18), and the clip is then firmly secured in position by forcing the socket members (6 and 8) over appropriately positioned studs welded to a workpiece. An end portion of a flexible pipe is then passed through the clamp portion (12) and forced into the hexagonal portion (18), which engages it and holds it against twisting movement and in close abutment to the rigid pipe.

The two finger pieces (32 and 36) are then pressed towards each other, forcing the locking members (28, 30) tightly to encircle the flexible pipe until the catch (38) engages with the catch (34) to hold the members (28 and 30) in locking position, gripping the flexible pipe against any movement longitudinally of the clip. The flexible pipe and the rigid pipe are thus held firmly in end-to-end communication. Attachment of the clip to studs also ensures that any chance of the pipes working free of the clip because of vibration is minimized.

If it is necessary to have the clip suitable for use with flexible pipe of slightly differing diameters, the catches (34 and 38) may be arranged in the form of teeth so that the members (28 and 30) may be locked in positions of slightly different diameter.

We claim:

1. A clip for a rigid hydraulic pipe and a flexible hydraulic pipe in end-to-end communication comprising:

a base, a frame portion extending upwardly from the base and comprising a circular bore adapted to receive an end portion of a rigid pipe as a force fit and a coaxial polygonal bore adapted to receive an end portion of a flexible pipe as a force fit and hold it against twisting and clamp means for embracing a flexible pipe extending upwardly from the base and comprising two generally circularly extending arms having interengageable catches, which arms can be interengaged to embrace a flexible pipe whose end portion is in the polygonal bore and hold the pipe against axial movement.

2. A clip according to claim 1 wherein the polygonal bore is hexagonal.

3. A clip according to claim 1 wherein the base comprises means by which the clip may be mounted on a workpiece.

4. A clip according to claim 1 wherein the arms each comprise an outwardly extending lever such that on the levers being pressed together the catches may readily be interengaged.

* * * * *